United States Patent
Yonetani et al.

(10) Patent No.: US 7,289,199 B2
(45) Date of Patent: Oct. 30, 2007

(54) ELECTRONIC IMAGING APPARATUS AND MICROSCOPE APPARATUS USING THE SAME

(75) Inventors: Atsushi Yonetani, Tama (JP); Yukio Nonoda, Ina (JP); Kazuhiko Yamanouchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/636,292

(22) Filed: Dec. 7, 2006

(65) Prior Publication Data

US 2007/0081145 A1 Apr. 12, 2007

Related U.S. Application Data

(62) Division of application No. 10/697,021, filed on Oct. 31, 2003, now Pat. No. 7,164,471.

(30) Foreign Application Priority Data

Nov. 8, 2002 (JP) ............................. 2002-325735

(51) Int. Cl.
*G01B 9/00* (2006.01)
*G02B 21/00* (2006.01)

(52) U.S. Cl. .................. 356/124; 356/124.5; 359/383; 359/385

(58) Field of Classification Search ................ 356/124, 356/124.5, 125–127; 359/371, 382–383, 359/385, 368; 250/458.1, 459.1, 201.3
See application file for complete search history.

(56) References Cited

U.S. PATENT DOCUMENTS

| | | | |
|---|---|---|---|
| 4,013,347 A | | 3/1977 | Nakamura |
| 4,331,132 A | * | 5/1982 | Mukasa ...................... 600/117 |
| 4,643,540 A | | 2/1987 | Kawasaki et al. |
| 5,311,304 A | * | 5/1994 | Monno ........................ 348/87 |
| 5,710,663 A | | 1/1998 | Kawasaki |
| 5,896,224 A | | 4/1999 | Kapitza |
| 6,384,967 B1 | | 5/2002 | Watanabe et al. |
| 6,496,308 B2 | | 12/2002 | Yonetani et al. |
| 6,594,075 B1 | | 7/2003 | Kanao et al. |
| 6,608,314 B1 | | 8/2003 | Hayashi |
| 6,674,574 B1 | | 1/2004 | Aono |
| 6,917,377 B2 | | 7/2005 | Aizaki et al. |

* cited by examiner

*Primary Examiner*—Sang H. Nguyen
(74) *Attorney, Agent, or Firm*—Kenyon & Kenyon LLP

(57) ABSTRACT

An electronic imaging apparatus includes a connecting section connected to an optical apparatus; an optical element having a preset transmittance with respect to light in a preset wavelength region, incident from the optical apparatus; and an electronic image sensor receiving the light transmitted through the optical element.

4 Claims, 12 Drawing Sheets

ELECTRONIC IMAGING APPARATUS AND MICROSCOPE APPARATUS USING THE SAME

This application is a divisional of U.S. patent application Ser. No. 10/697,021 filed on Oct. 31, 2003 now U.S. Pat. No. 7,164,471, which claims priority to Japanese Application No. 2002-325735 filed on Nov. 8, 2002, which is expressly incorporated herein in its entirety by reference thereto.

BACKGROUND OF THE INVENTION

1. Field of the Invention

This invention relates to an electronic imaging apparatus used to photograph (image) a specimen, and in particular, to an electronic imaging apparatus for microscopes used in a microscope.

2. Description of Related Art

FIG. 1 shows a conventional example where an imaging apparatus of a type in which a film is used is attached to a microscope.

In a microscope 11 of FIG. 1, light from a light source 13 in a source device 12 is rendered nearly parallel by a collector lens 14 and is reflected by a mirror 15 to irradiate a specimen (not shown in the figure) mounted on a stage 16. Light from the specimen is incident on a camera 18 through an objective lens 17 so that an image of the specimen is formed.

The camera 18 is attached to the microscope 11 through a mount, not shown, and light incident through the microscope 11 is imaged on the surface of a loaded film 19.

Also, in FIG. 1, reference numerals 20 and 20' represent eyepieces, numeral 21 represents a filter, 22 represents a driving means for moving the filter in and out of the optical path, and 23 represents a microscope support. Reference numeral 24 denotes a prism box for recognizing focusing and framing or calculating the amount of exposure and 25 denotes a shutter for exposure.

As imaging apparatuses used for microscope photography in recent years, electronic imaging apparatuses using electronic image sensors, such as CCDs, have been widely used. This is due chiefly to three factors: (1) the specimen can be easily imaged (photographed), (2) a photographed image is easily processed, and (3) the control and distribution of the photographed image are facilitated.

The electronic image sensors maintaining the leading position at present on a consumer market are being reduced in cost. Consequently, the cost of the entire imaging apparatus is also reduced so that a user can more easily purchase the microscope.

SUMMARY OF THE INVENTION

An electronic imaging apparatus of the present invention includes a connecting section connected to an optical apparatus; an optical element having a preset transmittance with respect to light in a preset wavelength region, incident from the optical apparatus; and an electronic image sensor receiving the light transmitted through the optical element.

A photographic camera connecting adapter of the present invention is interposed between an optical apparatus and a photographic camera and includes a first connecting section connected to the optical apparatus; a second connecting section connected to the photographic camera; and an optical element having a preset transmittance with respect to light in a preset wavelength region, incident from the optical apparatus.

A microscope apparatus of the present invention includes a microscope; an optical element having a preset transmittance with respect to light in a preset wavelength region, incident from the microscope; and an electronic image sensor receiving the light transmitted through the optical element.

These and other features and advantages of the present invention will become apparent from the following detailed description of the preferred embodiments when taken in conjunction with the accompanying drawings.

DETAILED DESCRIPTION OF THE PREFERRED EMBODIMENTS

First Embodiment

The first embodiment of the present invention will be described below.

Before undertaking the description of the first embodiment, the function of the present invention will be explained.

In front of a light-receiving section (namely on the light incidence side) of the electronic image sensor, a nearly plane-parallel glass plate is provided in order to protect the light-receiving section. Flare caused when the electronic imaging apparatus is connected to the microscope is chiefly attributed to this plane-parallel glass plate. This is because the reflectance of the surface of the plane-parallel glass plate is relatively high. Part of light incident on the light-receiving section is reflected by the plane-parallel glass plate. Reflected light is reflected again by lenses and other optical elements of a microscope optical system toward the electronic image sensor. This procedure is repeated a plurality of times and the so-called multiple reflection occurs. As a result, a great deal of spot-shaped flare (hereinafter called spot flare) is produced.

In this case, if the reflectance of the surface of the plane-parallel glass plate is high, the amount of light (the light intensity) of the spot flare will be increased. The spot flare is therefore imaged together with an image. In particular, the shape of a lens surface is nearly planar in the proximity of the optical axis, in which bright spot flare is liable to occur. Thus, in the present invention, an optical element that has a preset transmittance with respect to light in a preset wavelength region is interposed between the microscope optical system and the electronic image sensor. An ND (neutral density) filter is suitable for this optical element. What follows is a description of the ND filter cited as an example.

Figure 4:
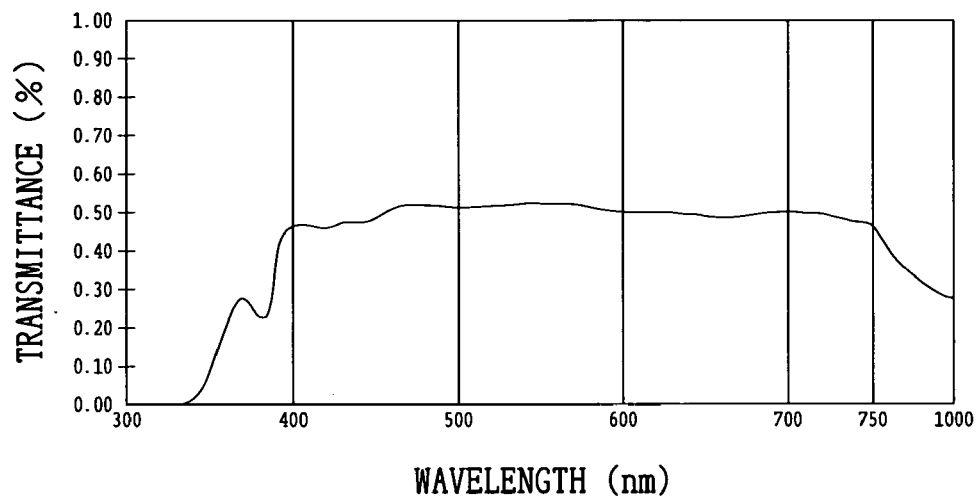
FIG. 4 is a diagram showing a spectral transmittance characteristic curve of an ND filter used in the first embodiment.
Figure 5:
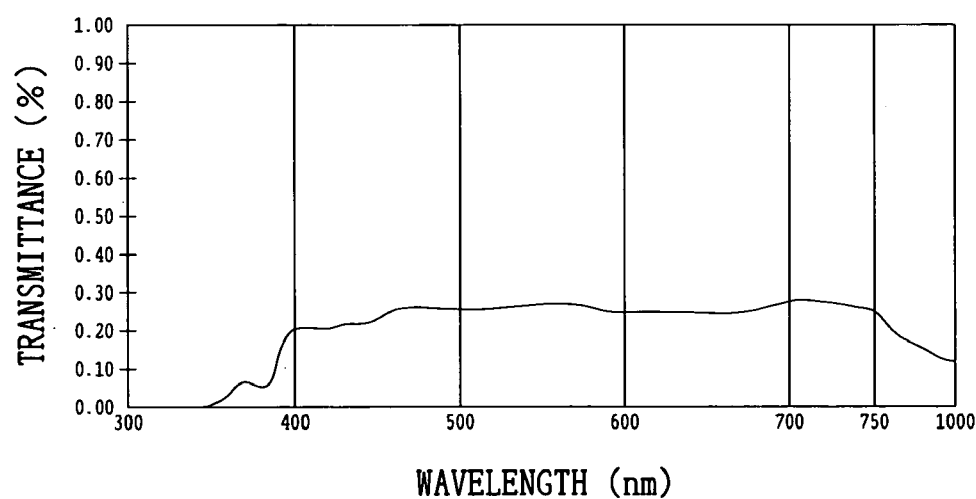
FIG. 5 is a diagram showing a spectral transmittance characteristic curve of another ND filter used in the first embodiment.

The ND filter, as shown in FIGS. 4 and 5 to be described later, refers to a filter which has almost the same transmittance in the visible region of wavelengths between about 500 and 600 nm.

In the above description, light undergoing multiple reflection passes through the ND filter over and over each time the light is reflected. Consequently, the amount of light undergoing multiple reflection is rapidly decreased, and the amount of light of the spot flare is relatively reduced with respect to the amount of light of the image. Finally, the difference of the amount of light between the image and the spot flare becomes considerably large, and hence the spot flare ceases to be visible.

Specifically, according to the present invention, an effect equivalent to the case where the reflectance of the plane-parallel glass plate provided on the electronic image sensor is reduced can be brought about. Whereby, an electronic imaging apparatus in which little flare is produced can be provided at low cost.

Moreover, the amount of light from the specimen is limited by the ND filter. Thus, a specimen that has too high a reflectance and transmittance for photography can now be photographed.

ND filters are of two types: absorption and reflection. The ND filter of the absorption type (color glass type), because of its fabrication process and properties of material, has impurities, such as bubbles or lumps, which remain in glass. In the electronic imaging apparatus of the present invention, the ND filter is located close to the light-receiving section (the imaging surface) of the electronic image sensor. As such, when the ND filter contains such impurities, there is the possibility that the impurities are imaged on a photographed image.

It is thus desirable to use the ND filter of the reflection type in which glass with few impurity can be used as a substrate. By doing so, the problem that the impurities are imaged on the image can be lessened.

It is desirable that the ND filter is designed to be replaceable or movable in and out of the optical path. When the ND filter is removed from the optical path, a dark specimen can be imaged as in a conventional way. When the ND filter is introduced into the optical path, a bright specimen which formerly has not been imaged can now be done. As mentioned above, the range of brightness in which an image can be formed (hereinafter called a brightness range) becomes wider than in the conventional way. This is favorable.

In order to have a striking effect on flare elimination and the enlargement of the brightness range, it is desirable that the transmittance of the ND filter is 50±10% or less, preferably 25±5% or less.

ND filters of the reflection type are of two types: metal film coat and interference film coat. The ND filter of the metal film coat type is less expensive than the ND filter of the interference film coat type, but is higher in surface reflectance than the ND filter of the interference film coat type. Conversely, the interference film coat type is more somewhat expensive than the metal film coat type, but is lower in surface reflectance than the metal film coat type. Thus, in view of the point that unnecessary reflection is not produced, it is desirable to choose the ND filter of the interference film coat type.

As discussed above, comparison of the interference film coat type with the metal film coat type shows that the interference film coat type has much lower surface reflection. In the interference film coat type, however, the surface reflection some-what occurs. The surface reflection is also responsible for flare.

It is thus favorable that the coated surface of the ND filter is placed to tilt with respect to the optical axis. By doing so, flare attributable to the surface reflection of the coated surface can be reduced. In this case, it is desirable that the tilting angle of the coated surface is set so that light reflected by the coated surface arrives outside the effective imaging area of the image sensor. However, when the tilting angle is too large, space required for placing the ND filter becomes wide. Consequently, the electronic imaging apparatus cannot be designed to be compact. In addition, the requirements of the mount cannot be fulfilled.

In the interference film coat type, the interference film is designed so that the optimum spectral transmittance characteristic is obtained with respect to a light ray at a particular angle of incidence (incident perpendicularly on the coated surface in most cases). As such, if the tilting angle is largely deviated from the particular angle, the optimum spectral transmittance characteristic cannot be obtained.

Thus, in order to minimize the space for placing the ND filter and maintain the characteristic of the interference film relative to the angle of the incidence of the ray, it is good practice to place the ND filter so that the coated surface is tilted in the direction of the minor side of the effective imaging area. In this case, it is desirable that the tilting angle of the coated surface satisfies the following condition:

$$2 \times L1 \times \tan 2\theta + L1 \times \tan 4\theta \geq L2/2 \tag{1}$$

where $L1$ is a distance extending along the optical axis from the coated surface of the ND filter to the light-receiving section of the electronic image sensor, $L2$ is the length of the minor side of the effective imaging area in the light-receiving section of the electronic image sensor, and $\theta$ is an angle made by a reference axis with the coated surface, where a direction perpendicular to the optical axis is assumed as the reference axis.

Figure 2:
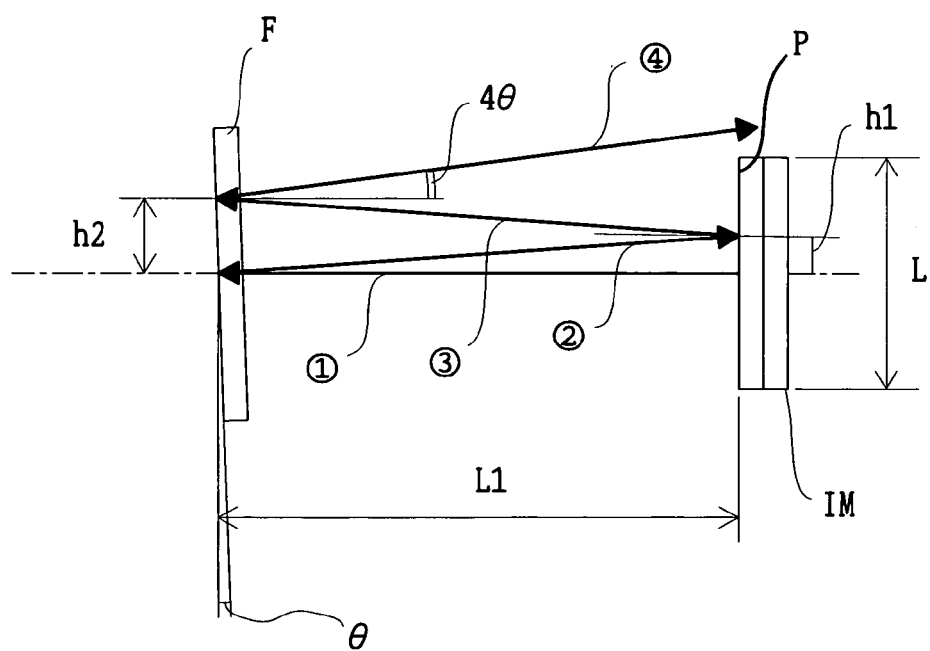
FIG. 2 is a view for explaining the property of light reflected by an ND filter toward an electronic image sensor.

Condition (1) prescribes that light reflected by the ND filter to travel toward the electronic image sensor arrives only once at the light-receiving section of the electronic image sensor. With reference to FIG. 2, a description will be given of this point.

Light from the specimen passes through an ND filter F and reaches a light-receiving section IM of the electronic image sensor. Part of the light having reached this section (on-axis light, here) is reflected by the surface of a plane-parallel glass P provided ahead of the light-receiving section IM (a ray ①). Subsequently, the ray ① is incident on the coated surface (the surface coated with the interference film) of the ND filter. Here, when a direction perpendicular to the optical axis (or a direction parallel to the light-receiving surface of the light-receiving section IM) is assumed as a reference axis, the ND filter F is placed so that the coated surface is tilted by the angle θ with respect to the reference axis. That is, the coated surface of the ND filter is not parallel to the surface of the plane-parallel glass P. Consequently, the light (the ray ①) incident on the coated surface is reflected at an angle of 2θ with the optical axis toward the light-receiving section IM (a ray ②).

The ray ② traveling toward the light-receiving section IM, after being reflected by the surface of the plane-parallel glass P, is directed again toward the ND filter F (a ray ③). However, the coated surface, as mentioned above, is tilted with respect to the reference axis. Hence, the ray ③ is reflected at a larger angle than the ray ① and travels toward the light-receiving section IM (a ray ④). As a result, the ray ④ traveling toward the light-receiving section IM passes through the outside of the effective imaging area of the light-receiving section IM. Of rays thus incident on the light-receiving section IM, only the ray ② is reflected by the coated surface of the ND filter F to reach the light-receiving section IM.

As discussed above, when the tilting angle satisfies the above condition, the light (the on-axis light) reflected by the ND filter arrives only once at the light-receiving section of the electronic image sensor. Furthermore, the coated surface of the ND filter requires a small tilting angle. Therefore, the production of flare is kept to a minimum and the space for placing the ND filter can be reduced. Since the tilting angle can be made small, the spectral transmittance characteristic of the ND filter can be made nearly equal to that of the ND filter which is not tilted.

If the tilting angle fails to satisfy the condition, light (on-axis light) reflected by the coated surface of the ND filter to reach the electronic image sensor will be produced at least twice. Consequently, a great deal of flare is produced, which is unfavorable.

The following condition approximating Condition (1) can also be used:

$$2 \times L1 \times \tan 4\theta \geq L2/2 \qquad (1')$$

It is further desirable to satisfy the following condition:

$$L1 \times \tan 2\theta \geq L2/2 \qquad (2)$$

When Condition (2) is satisfied, light traveling from the coated surface of the ND filter toward the electronic image sensor, namely the ray ② of FIG. 2, never reaches the light-receiving section of the electronic image sensor. The production of flare can thus be suppressed. Also, the above condition is suitable for the case where there is sufficient space for placing the ND filter.

The ND filter can also be used as dustproof glass. As stated above, the plane-parallel glass is provided ahead of the light-receiving section of the electronic image sensor. The plane-parallel glass is located closer to the image position (the light-receiving surface) than the ND filter. Therefore, if dust particles and flaws exist on the plane-parallel glass, a problem will arise because they are imaged together with the image. The placement of the ND filter, however, prevents the adhesion of dust particles and damage to the plane-parallel glass provided in the light-receiving section.

In the metal film coat type and the interference film coat type, the ND coats can be applied on the surfaces of other optical elements. Thus, from the viewpoint that the number of parts is not increased, such coat types are favorable.

In an ordinary electronic image sensor, the dustproof glass, the low-pass filter, the IR cutoff filter, and the plane-parallel glass of the light-receiving section are used as optical elements to which the ND coats are applicable. Thus, it is only necessary that the ND coat of the metal film coat type or the interference film coat type is applied to at least one of these optical elements.

Some of particular electronic imaging apparatuses have the systems that the electronic image sensor and the image are relatively moved and special image processing is used, thereby improving substantial resolution of the electronic image sensor. In this case, since the low-pass filter is not essentially placed, the optical elements to which the ND coats are applicable are the dustproof glass, the IR cutoff filter, and the plane-parallel glass of the light-receiving section.

Thus, it is only necessary that the ND coat of the metal film coat type or the interference film coat type is applied to at least one of these optical elements.

It is desirable that the ND filter is located as far away from the light-receiving section as possible. By doing so, even though flaws and adhering dust particles are imaged, their images can be rendered almost invisible.

Subsequently, the first embodiment will be described with reference to FIGS. 3, 4, and 5.

Figure 3:
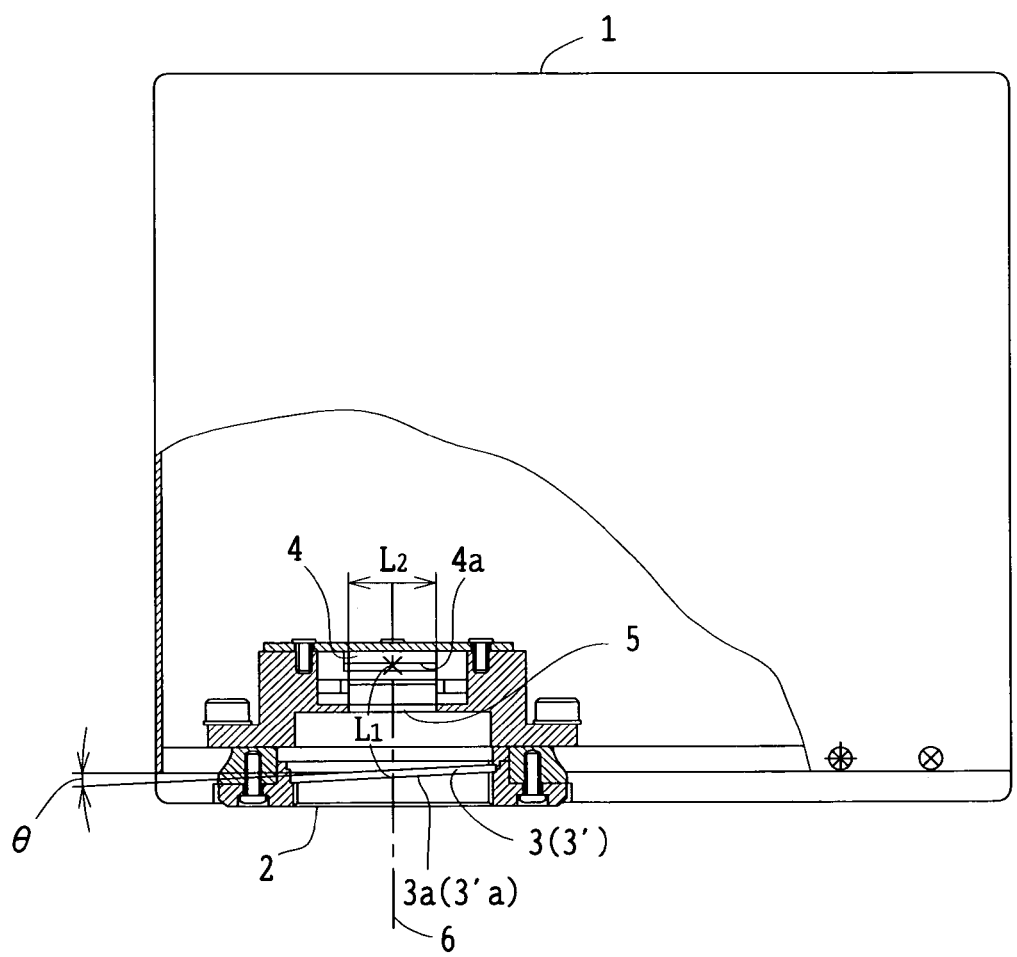
FIG. 3 is a sectional view showing essential parts in a first embodiment of the electronic imaging apparatus for microscopes according to the present invention.

FIG. 3 shows essential parts in the first embodiment of the electronic imaging apparatus for microscopes according to the present invention. The electronic imaging apparatus of this embodiment includes a body section 1, a mount section 2 connected to the body section 1, and an ND filter 3 designed as an attenuation filter provided in the mount section 2. The body section 1 has a CCD 4 as the electronic image sensor. One surface of the mount section 2 comes in contact with the surface of the body section 1 and both are fixed by screws. The opposite surface is provided with a C mount as a connecting section for being connected to an optical apparatus such as a microscope.

The ND filter 3 is the optical element that transmits light in a preset wavelength region, of light incident from the optical apparatus, in accordance with a preset transmittance. Also, in FIG. 3, reference numeral 5 denotes a low-pass filter to which an IR cutoff coat is applied and 6 denotes an optical axis.

In the first embodiment, the ND filter 3 is such that the ND coat of the interference film type is applied to the plane-parallel glass. When a direction perpendicular to the optical axis 6 is assumed as a reference axis, the ND filter 3 is located at the tilting angle of θ=2° with the reference axis. The coated surface of the ND filter 3 is, of course, located at the tilting angle of θ=2°. A tilting direction is a direction followed along the minor side of a light-receiving surface 4a. The distance L1 extending along the optical axis 6 from a surface 3a of the ND filter 3 to the light-receiving surface 4a of the CCD 4 is 13 mm. The length L2 of the minor side of the effective imaging area in the CCD 4 is 6.6 mm. The transmittance of the ND filter 3 is 50±10% in the wavelength range from 500 to 600 nm. Here, the spectral transmittance characteristic curve of the ND filter 3 is shown in FIG. 4.

Also, the first embodiment, which satisfies Condition (1), fails to satisfy Condition (2). In order to satisfy Condition (2), the ND filter 3 must be tilted by at least 7.2°.

In the first embodiment, the ND filter 3 is placed so that the ND coated surface 3a is situated on the opposite side (the optical apparatus side) of the light-receiving surface 4a. Whereby, a high-reflectance coated surface can be isolated from the light-receiving surface 4a.

The ND filter 3 is designed to be movable in and out of the optical path. In the first embodiment, the mount section 2 is attached to the body section 1 by screws. Thus, by removing the screws, the ND filter 3 can be replaced with an ND filter 3' that has spectral transmittance characteristics different from those of the ND filter 3. For example, instead of the ND filter 3, the ND filter 3' whose transmittance is 25±5% in the wavelength range from 500 to 600 nm may be used. The spectral transmittance characteristic curve of the ND filter 3' is shown in FIG. 5.

Also, even when the ND filter 3 is replaced with the ND filter 3', the distance L1 extending along the optical axis 6 from a surface 3'a of the ND filter 3' to the light-receiving surface 4a of the CCD 4, the tilting angle θ, and the tilting direction are almost the same as in the ND filter 3.

Figure 1:
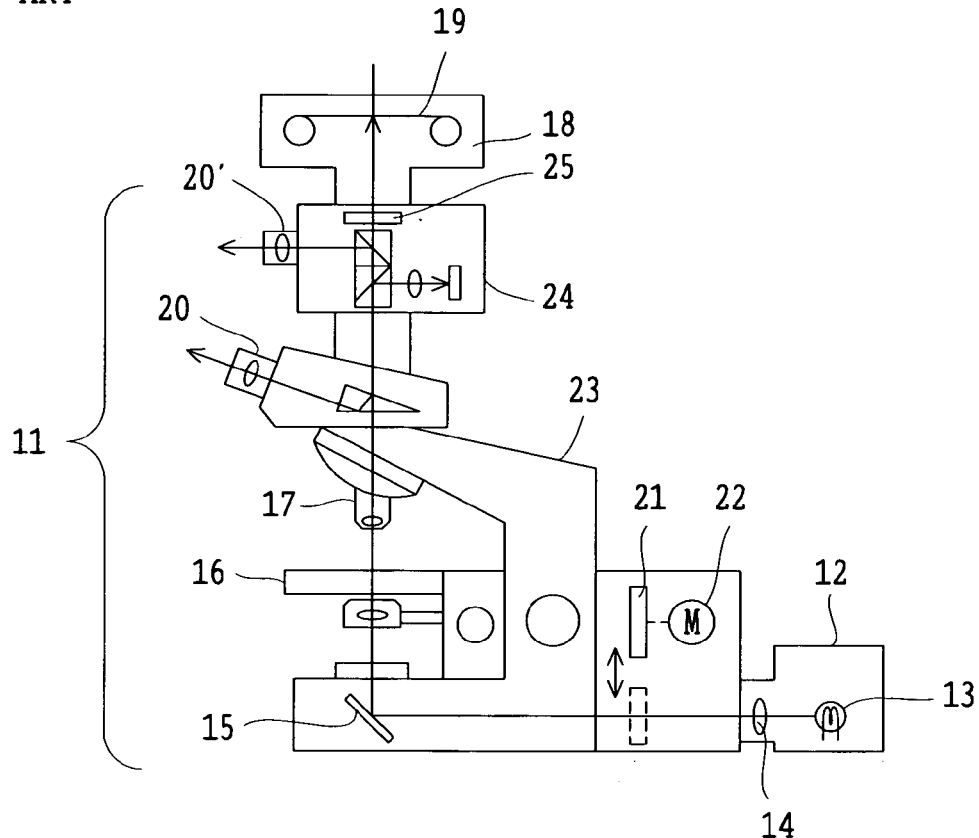
FIG. 1 is a view schematically showing a conventional example where an imaging apparatus using a film is attached to a microscope.

The electronic imaging apparatus of the first embodiment constructed as mentioned above, when photographing the specimen, is connected to the microscope, such as that shown in FIG. 1, through the mount section 2. According to the first embodiment, light from the specimen through the microscope is first attenuated by the ND filter 3. Attenuated light reaches the light-receiving section 4a of the CCD 4 to form the image of the specimen. In this case, part of the light having reached the light-receiving section 4a is reflected by a plane-parallel glass (a protection glass protecting the light-receiving section 4a) provided ahead of the light-receiving section 4a and is returned to the microscope optical system. This reflected light, which repeats multiple reflection between the plane-parallel glass and the microscope optical system, passes through the ND filter 3 over and over each time the reflection is repeated. Hence, the light undergoing the multiple reflection, namely flare light, is rapidly attenuated, and a difference in the amount of light between the image and the flare light becomes considerable. Consequently, the spot flare ceases to be relatively visible. In particular, when a high-reflectance specimen is photographed, light from the specimen is bright and thus a marked effect is brought about by the ND filter.

The ND filter 3 is coated with the interference film. Thus, there is little possibility that, like the ND filter of the absorption type, bubbles and lumps are images on the photographed image.

In the electronic imaging apparatus of the first embodiment, the ND filter is obliquely placed with a relative relationship of arrangement mentioned above in respect of the light-receiving surface 4a of the CCD 4. Whereby, light reflected by the ND coated surface arrives once or less at the light-receiving section, and the production of flare can be suppressed. Moreover, since the ND filter 3 is tilted in the direction of the minor side of the effective imaging area of the CCD 4, a small tilting angle is enough and the space for placing the ND filter can be minimized.

Since the first embodiment is constructed so that the ND filter 3 and the ND filter 3' are movable in and out of the optical path and are replaceable, the ND filter 3 or 3' with different transmittance characteristics is used in accordance with the brightness of the specimen, and thereby a specimen with brightness in a wider range can be imaged.

Also, although in the first embodiment the IR cutoff coat is applied to the low-pass filter, a low-pass filter to which the IR cutoff coat is not applied is sometimes used. In this case, it is only necessary that, instead of the ND filter, the IR cutoff filter is placed in the same way. At this time, it is good practice to apply the ND coat to a surface opposite to the surface to which the IR cutoff coat is applied.

In the first embodiment, the plane-parallel glass P is thought of as being designed so that an antireflection coat is not applied. However, when the antireflection coat is applied, a considerable effect of suppressing the production of flare is obtained. As such, when the plane-parallel glass to which the antireflection coat is applied is combined with the ND filter, the production of flare can be further suppressed.

It is expected that the application of the antireflection coat increases the cost of the electronic image sensor. However, the ND filter can be eliminated as the case may be. In this instance, there is the possibility that an increase in cost due to the application of the antireflection coat is neutralized by the elimination of the ND filter. In addition, by the elimination of the ND filter, the compact design and cost reduction of the entire electronic imaging apparatus can be afforded.

The effect of tilting the optical element to reduce flare caused by its surface reflection is beneficially brought about not only by the ND filter, but also by all optical elements (including the IR cutoff filter and a light-receiving surface protecting glass expected in the future) in the camera placed ahead of the light-receiving surface. Thus, Condition (1) or (2) may be applied to all optical elements in the camera placed ahead of the light-receiving surface.

Second Embodiment

The second embodiment will be described with reference to FIGS. 6, 7A, and 7B.

In the second embodiment, the ND filter is placed as anti-flare member suppressing the production of flare in a microscope photographic camera connecting adapter. Specifically, as shown in FIG. 6, the microscope photographic camera connecting adapter is placed to be mountable and dismountable between a microscope 28 and a television (TV) camera 29.

Figure 7A:
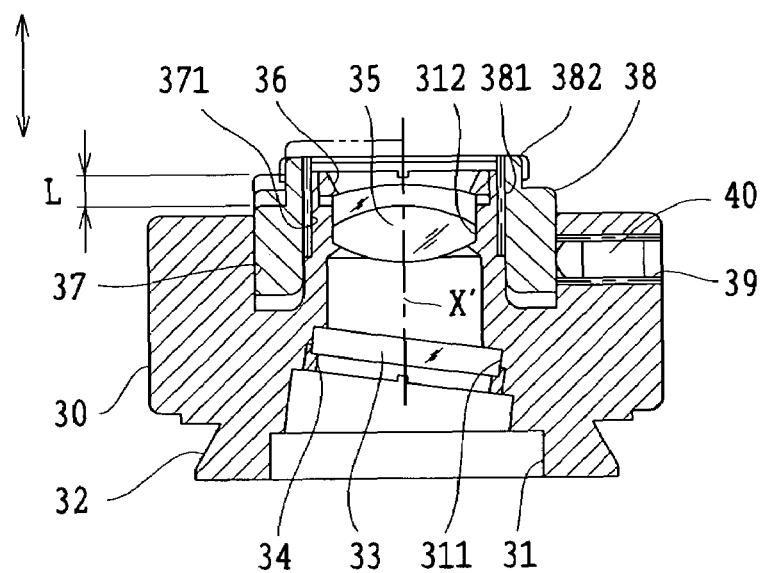
FIGS. 7A and 7B are sectional and plan views, respectively, showing a photographic camera connecting adapter used in the second embodiment.
Figure 7B:
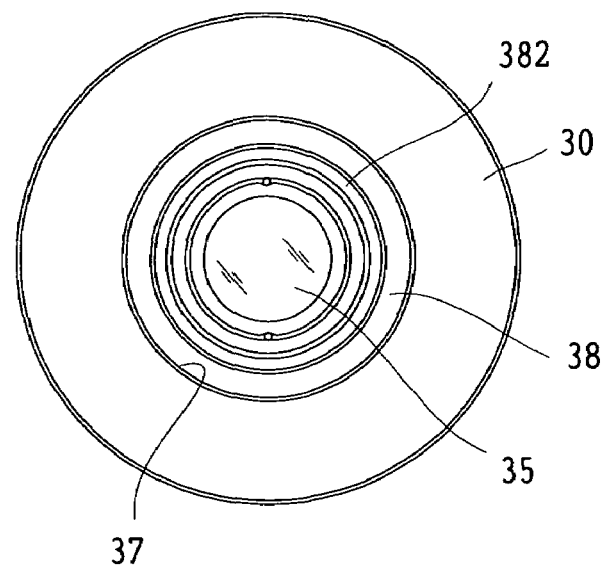

FIGS. 7A and 7B illustrate the microscope photographic camera connecting adapter according to the second embodiment. An adapter body 30 has a dovetail 32 attached to be mountable and dismountable to the microscope 28.

At the middle of an optical path 31 of the adapter body 30, a filter mounting step 311 is configured at a preset tilting angle with an imaging optical axis X'. For example, an attenuation filter 33, such as the ND filter, is mounted to the step 311, by means of a cap ring 34, at the preset tilting angle with the imaging optical axis X'. Along the optical path 31 of the adapter body 30, a lens mounting portion 312 is configured behind the step 311 so that a projection lens 35 is mounted to the lens mounting portion 312 by means of a cap ring 36.

In the adapter body 30, a concave guide 37 for parfocality adjustment is configured on the opposite side of the dovetail 32, and an adjusting screw 371 is provided at the top of the guide. A screw 381 of a mount member 38, called the C mount, is adjustably engaged with the adjusting screw 371. The adjusting range of this screw correspond to a parfocality adjusting range L.

The mount member 38 is provided with a camera mounting portion 382 at the top, and the TV camera 29 is mounted and dismounted with respect to the camera mounting portion 382.

The adapter body 30 is configured with a mount positioning screw hole 39 perpendicular to the imaging optical axis X', and a clamp screw 40 is threaded into the screw hole 39. The clamp screw 40 is such that its top is pressed against a concavity (not shown) configured on the periphery of the mount member 38, which can be positioned along the imaging optical axis X'.

In the structure mentioned above, the dovetail 32 is fitted into a dovetail groove (not shown) of a lens barrel 15 to mount the adapter body 30 to the lens barrel 15, and a mounting portion (not shown) of the TV camera 29 is attached to the camera mounting portion 382 of the mount member 38. In this case, the clamp screw 40 is loosened, and the engagement of the screw 381 of the mount member 38 with the adjusting screw 371 of the adapter body 30 is adjusted to make the parfocality adjustment of the TV camera 29. When this adjustment is completed, the clamp screw 40 is tightened so that its top is pressed against the concavity (not shown) on the periphery of the mount member 38, and the adapter body 30 and the mount member 38 are mutually positioned.

The image of the specimen is conducted to the optical path 31 of the adapter body 30 from the imaging optical axis X'. The image conducted to the adapter body 30, after being attenuated by the attenuation filter 33, is projected on an image sensor 60 of the TV camera 29 through the projection lens 35, and observation image data are acquired. The observation image data are automatically controlled, for example, by an auto gain control function, and are displayed on a monitor.

In this case, of light incident on and reflected by the specimen, reflected light from the surface of the image sensor 60 is transmitted again and attenuated through the attenuation filter 33 and is reflected toward the microscope 28. The reflected light reflected by the surface of a prism in the microscope 28 is transmitted again attenuated through the attenuation filter 33 and is conducted to the image sensor 60 through the projection lens 35. In this way, the reflected light passes through the attenuation filter over and over and is attenuated, and thereby an observation image of high quality is displayed on a monitor (not shown) so that observation with a high degree of accuracy can be carried out.

Here, since reflection occurs even at the surface of the attenuation filter 33, the attenuation filter 33 is placed to tilt with respect to the imaging optical axis X', thereby lessening the influence of reflection on the observation image.

For example, when the ND filter with a spectral transmittance of 50% is used as the attenuation filter 33, light incident from the observation optical axis X' is attenuated to ½ by the attenuation filter and enters the image sensor 60 through the projection lens 35. Here, the light-receiving sensitivity range of the image sensor 60 is much wider than that of the human's eye, and the observation image data are automatically controlled, for example, by the auto gain control function, and are displayed on the monitor (not shown). Thus, there is little influence on the observation image.

In this observation state, reflected light from the surface of the image sensor 60 travels along the imaging optical axis X' in a reverse direction, and after being transmitted through the attenuation filter 33, is conducted toward the microscope 28. The light is reflected by the surface of the prism in the microscope 28 and is transmitted again through the attenuation filter 33 to enter the image sensor 60. This reflected light is transmitted twice through the attenuation filter 33 and thus is attenuated to ¼ of the original amount of light.

In the use of the TV camera 29 where the light-receiving sensitivity range is narrow, when a monitor image is dark, the attenuation filter 33 of the adapter body 30 is replaced with the one of the optimum spectral transmittance to obtain the observation image.

In accordance with the imaging performance of the TV camera 29 attached to the camera mounting portion 382 of the mount member 38, the attenuation filter may be separated from the adapter body 30 to make observations. In this case, the clamp screw 40 threaded into the screw hole 39 of the adapter body 30 is loosened and the mount member 38 is turned and is moved and adjusted along the imaging optical axis X'. Thus, the adjustment of the optical path length (the parfocality adjustment) is made so that a desired observation image can be acquired.

As mentioned above, the microscope photographic camera connecting adapter is constructed so that the attenuation filter 33 is incorporated and placed to make a preset tilting angle with the imaging optical axis X' in the adapter body 30, and reflected light from the surface of the image sensor 60 is effectively attenuated by the attenuation filter 33.

According to the above description, the phenomenon of the spot flare caused by the reflected light from the surface of the image sensor 60 can be prevented and the observation image with a high degree of accuracy is easily acquired without undergoing the influence of properties of the image sensor 60 of the TV camera 29, so that observation accuracy can be improved. Whereby, it becomes possible that an observer sets the TV camera 29 at will to acquire the observation image with a high degree of accuracy. As a result, a wide variety of applications of microscopes can be expected.

Third Embodiment

Figure 8A:
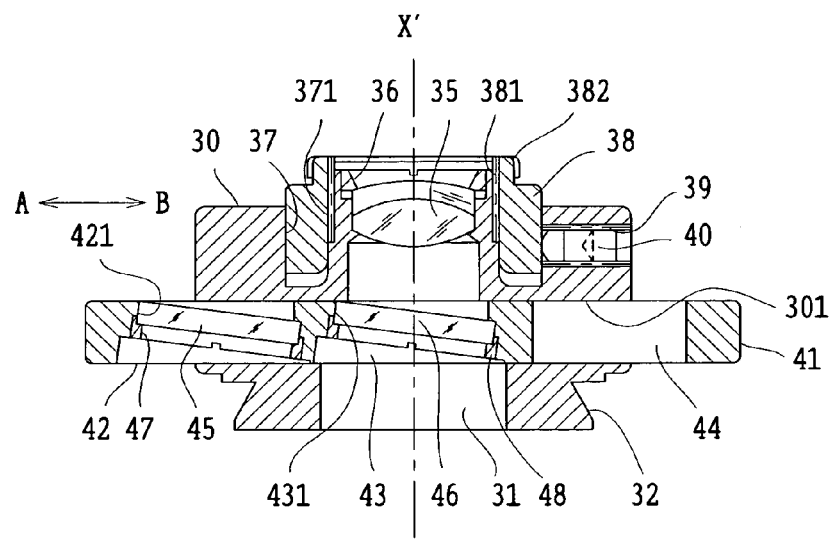
FIGS. 8A and 8B are sectional and plan views, respectively, showing the photographic camera connecting adapter used in a third embodiment of the present invention.
Figure 8B:
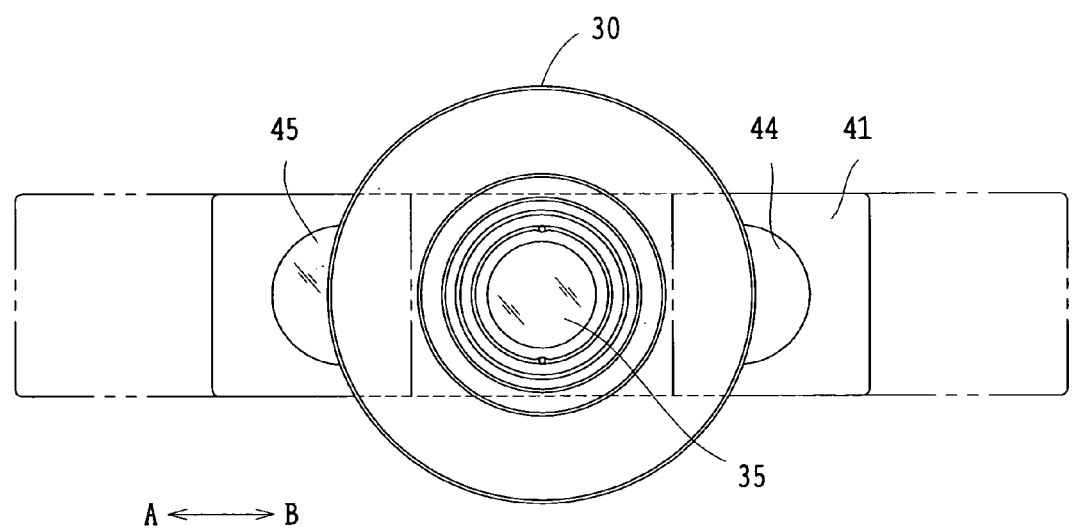

The third embodiment will be described with reference to FIGS. 8A and 8B. It is also possible that the attenuation filter is constructed as shown in FIGS. 8A and 8B. In FIGS. 8A and 8B. like numerals are used for like members and parts with respect to FIGS. 7A and 7B and their explanation is omitted.

In the adapter body 30, a through hole 301 for guide is provided, at its middle, in a direction perpendicular to the optical path 31, that is, in the direction of an arrow A or B (in a direction perpendicular to the imaging optical axis X'). A slide member 41 mounting the attenuation filters is movably fitted into the through hole 301. In the slide member 41, a first opening 42, a second opening 43, and a third opening 44, corresponding to the optical path 31 of the adapter body 30, are configured at preset intervals.

The first and second openings 42 and 43 are provided with steps 421 and 431, respectively, constituting filter sections, each at a preset tilting angle with the imaging optical axis X'. In the steps 421 and 431, a first attenuation filter 45 and a second attenuation filter 46, such as the ND filters, for example, of different spectral transmittances, are mounted by means of cap rings 47 and 48, respectively, making preset tilting angles with the imaging optical axis X'. As the first and second attenuation filters 45 and 46, the ones with different spectral transmittances, for example, of 50% and 25% are used.

In the above structure, when the specimen is observed, the slide member 41 is moved in the direction of the arrow A or B so that one of the first, second, and third openings 42, 43, and 44 is selectively introduced into the optical path 31 of the adapter body 30. In a state where either of the first opening 42 or the second opening 43 is introduced into the optical path 31 of the adapter body 30, reflected light is attenuated in accordance with the spectral transmittance of the first attenuation filter 45 or the second attenuation filter 46. In a state where the third opening 44 is introduced into the optical path 31 of the adapter body 30, no filter is used and an observation image in which reflected light is not attenuated is obtained.

Also, the embodiment described with reference to FIGS. 8A and 8B is constructed so that the slide member 41 is placed to be movable in the direction of the arrow A or B with respect to the optical path 31 of the adapter body 30. However, the embodiment is not limited to this structure, and it is also possible to have a so-called turret structure in which a plurality of filter sections are arranged on a disk-shaped turret member at preset intervals with respect to the optical path 31 of the adapter body 30 and the turret member is turned so that each of the filter sections or openings is introduced into the optical path 31 of the adapter body 30.

In the above description, reference has been made to the structure in which the attenuation filter 33 and the first and second attenuation filters 45 and 46 are used as the optical elements. However, the optical elements are not limited to such filters, but the one, such as the IR cutoff filter, can be used.

Fourth Embodiment

The fourth embodiment will be described with reference to FIG. 9. Even when the adapter is constructed as shown in FIG. 9, nearly the same effect is expected.

Figure 6:
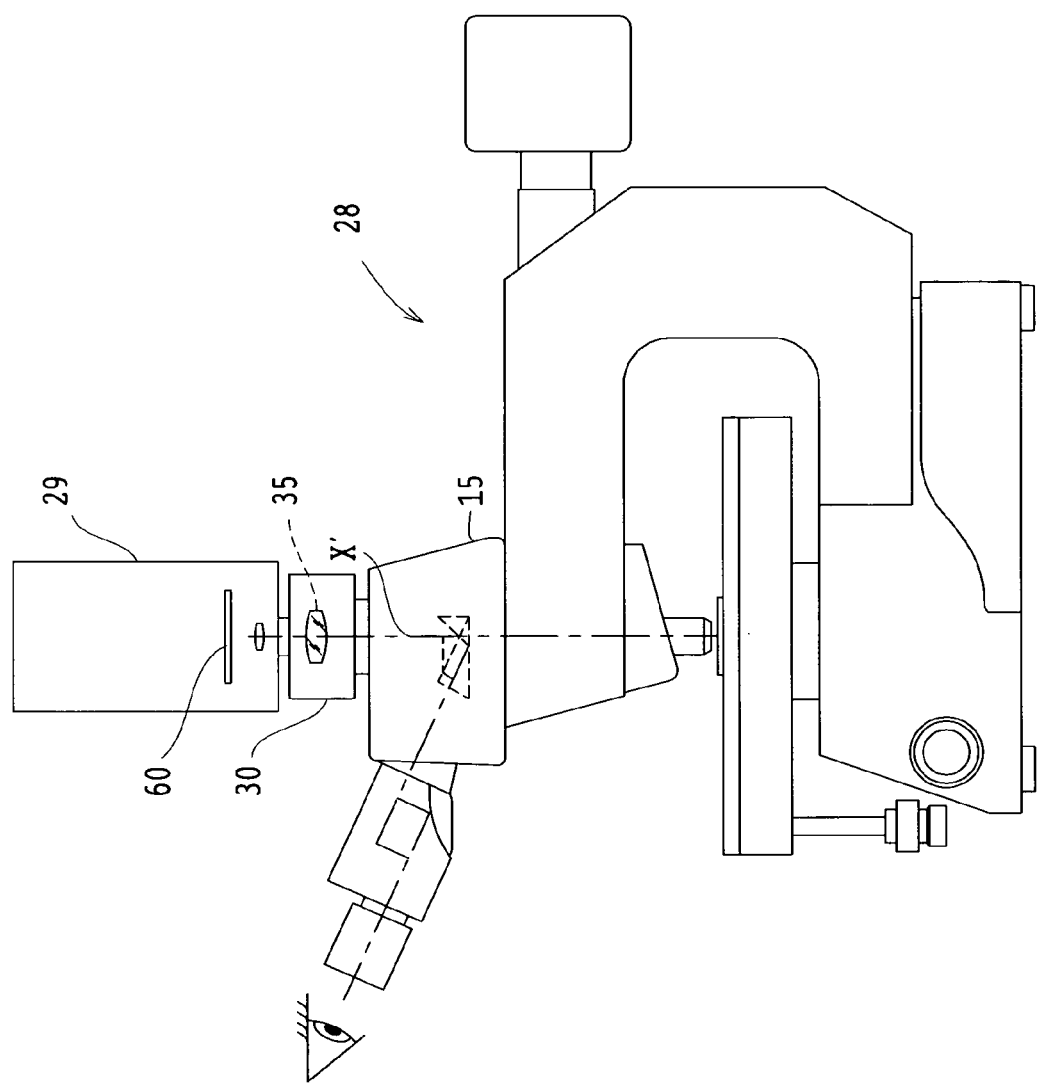
FIG. 6 is a side view showing a second embodiment of the electronic imaging apparatus for microscopes according to the present invention.
Figure 9:
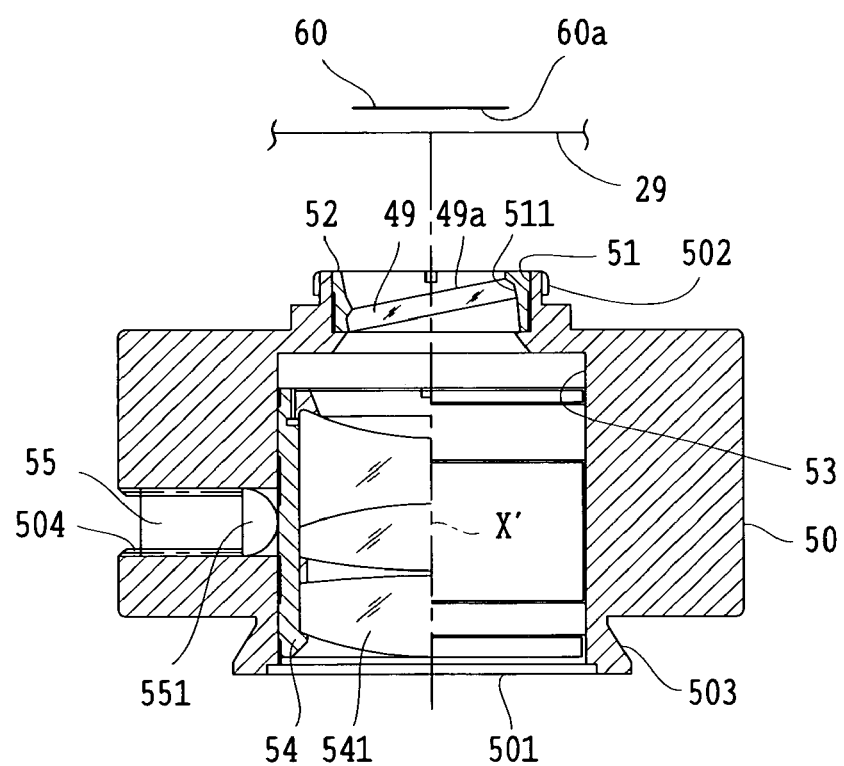
FIG. 9 is a sectional view showing the photographic camera connecting adapter used in a fourth embodiment of the present invention.

As shown in FIG. 9, an adapter body 50 is provided with an optical path 501 corresponding to the imaging optical axis X' of the microscope 28 (refer to FIG. 6). At one end of the adapter body 50, a mount section 502 for mounting the camera is provided outside the end with respect to the mounting portion of the TV camera 29 (refer to FIG. 6), and a first housing section 51 which is annular is provided inside the end.

A screw 511 is provided on the inner wall of the first housing section 51 and is engaged with a screw (not shown) provided on the outer wall of an element supporting frame 52 so that the element supporting frame 52 is removably threaded into the first housing section 51. The element supporting frame 52 is mounted with an ND filter 49 which is the optical element making at a preset tilting angle with the optical axis.

The element supporting frame 52 can be constructed to be movable in and out of the first housing section 51 not only by the engagement with the screw of the first housing section 51, but also by fitting the frame 52 into the first housing section 51 in such a way that it is dropped thereinto.

At the other end of the adapter body 50, a dovetail 503 for mounting the lens barrel is provided outside the end, and a second housing section 53 is configured inside the end. A lens supporting frame 54 holding a projection lens unit 541 is inserted into the second housing section 53. The lens supporting frame 54 is provided with a plurality of positioning concavities (not shown) at preset intervals on its peripheral surface.

In the adapter body 50, a plurality of positioning screw holes 504 are provided opposite to the above concavities (not shown) of the lens supporting frame 54 and a clamp screw 55 is threaded into each of the screw holes 504. The clamp screw 55 is provided with a fitting portion 551 at its top so that the clamp screw 55 is moved back and forth in the screw hole 504 and thereby the fitting portion 551 is selectively engaged with one of the concavities (not shown) of the lens supporting frame 54. In a state where the fitting portion 551 of the clamp screw 55 is engaged, the lens supporting frame 54 is located at a desired position in the second housing section 53 of the adapter body 50.

By the above construction, the dovetail 503 of the adapter body 50 is fitted into the dovetail groove (not shown) of the lens barrel 15 (see FIG. 6) of the microscope and the TV camera 29 is mounted to the mount section 502. Whereby, the TV camera 29 is connected to the lens barrel 15. In this case, the clamp screw 55 is released and the parfocality adjustment of the TV camera 29 mounted to the mount section 501 is made. When this adjustment is completed, the clamp screw 55 is tightened and mutual positioning is performed.

In the fourth embodiment, by incorporating and placing the element supporting frame 52 in the first housing section 51 of the adapter body 50 on the side of the TV camera 29, the inserting and removing operation of the element supporting frame 52 can be facilitated and its handling becomes easy. Moreover, since the ND filter 49 is not placed at an intermediate imaging position, the effect of becoming hard to undergo the influences of dust and flaws is brought about.

In the fourth embodiment, since the ND filter 49 is interposed between the lens supporting frame 54 for arranging the projection lens unit 541 and the TV camera 29, the diameter of the ND filter 49 can be set to a minimum and the effect of facilitating compactness is obtained.

The fourth embodiment, similar to the third embodiment of FIGS. 8A and 8B, can also be constructed so that a filter switching mechanism in which a plurality of ND filters 49 with different spectral characteristics are arranged side by side is mounted and one of the ND filters is selectively placed on the optical axis.

Here, in the fourth embodiment, the ND filter 49 is designed to use the plane-parallel glass to which the ND coat of the interference film type is applied. When the direction perpendicular to the optical axis X' is assumed as the reference axis, the ND filter 49 is placed to tilt at the tilting angle of $\theta=2°$ with respect to the reference axis. A coated surface 49a of the ND filter 49 is, of course, placed at the tilting angle of $\theta=2°$ with the reference axis. The tilting direction is a direction followed along the minor side of a light-receiving surface 60a. The distance L1 extending along the optical axis X' from the coated surface 49a of the ND filter 49 to the light-receiving surface 60a of the image sensor 60 is 13 mm. The length L2 of the minor side of the effective imaging area in the image sensor 60 is 6.6 mm.

Figure 10:
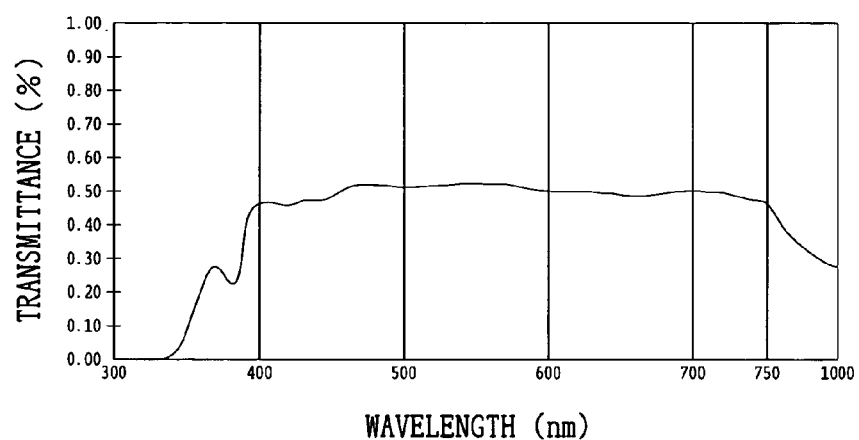
FIG. 10 is a diagram showing a spectral transmittance characteristic curve of an ND filter used in the photographic camera connecting adapter of FIG. 9.

The spectral transmittance of the ND filter 49 is 50±10% in the wavelength range from 500 to 600 nm. Here, the spectral transmittance characteristic curve of the ND filter 49 is shown in FIG. 10.

Also, the fourth embodiment, which satisfies Condition (1), fails to satisfy Condition (2). In order to satisfy Condition (2), the ND filter 49 must be tilted by at least 7.2°.

In the fourth embodiment, the ND filter 49 is placed so that the coated surface 49a is situated on the opposite side (the optical apparatus side) of the light-receiving surface 60a. Whereby, a high-reflectance coated surface 49a can be isolated from the light-receiving surface 60a.

The ND filter 49 is designed to be movable in and out of the optical path. In the fourth embodiment, the element supporting frame 52 is mounted in the first housing section 51 of the adapter body 50. Thus, by removing the element supporting frame 52, the ND filter 49 can be replaced with the one of different spectral transmittance characteristics.

Figure 11:
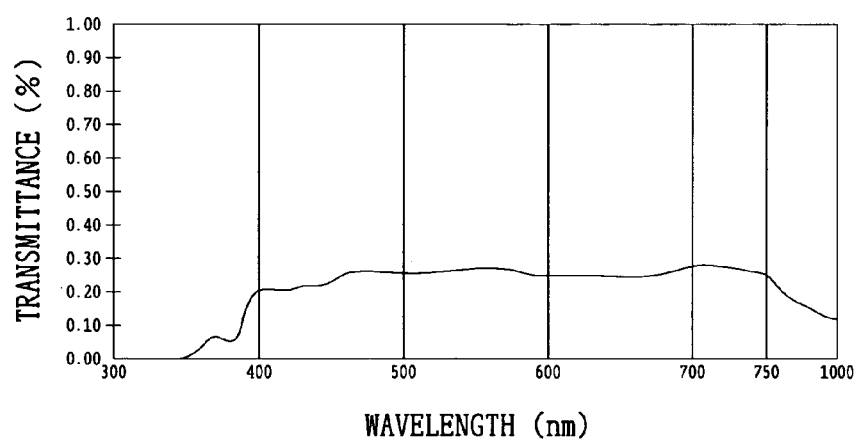
FIG. 11 is a diagram showing a spectral transmittance characteristic curve of another ND filter used in the photographic camera connecting adapter of FIG. 9.

For example, instead of the ND filter 49, an ND filter 49' (not shown) whose transmittance is 25±5% in the wavelength range from 500 to 600 nm may be used. The spectral transmittance characteristic curve of the ND filter 49' is shown in FIG. 11.

Also, even when the ND filter 49 is replaced with the ND filter 49', the distance L1 extending along the optical axis X' from a coated surface 49'$a$ to the light-receiving surface 60$a$ of the image sensor 60, the tilting angle θ, and the tilting direction are almost the same as in the ND filter 49.

The electronic imaging apparatus of the fourth embodiment constructed as mentioned above, for example, when photographing the specimen, is connected to the microscope 28, such as that shown in FIG. 6, through the mount section 502. According to the fourth embodiment, light from the specimen through the microscope 28 is first attenuated by the ND filter 49 (49'). Attenuated light reaches the light-receiving surface 60$a$ of the image sensor 60 to form the image of the specimen. In this case, part of the light having reached the light-receiving surface 60$a$ is reflected by a plane-parallel glass (a protection glass protecting the light-receiving surface 60$a$) provided ahead of the light-receiving surface 60$a$ and is returned to the microscope optical system. This reflected light, which repeats multiple reflection between the plane-parallel glass and the microscope optical system, passes through the ND filter 49 (49') over and over each time the reflection is repeated. Hence, the light undergoing the multiple reflection, namely flare light, is rapidly attenuated, and a difference in the amount of light between the image and the flare light becomes considerable. Consequently, the spot flare ceases to be relatively visible. In particular, when a high-reflectance specimen is photographed, light from the specimen is bright and thus a marked effect is brought about by the ND filter 49 (49').

The ND filter 49 (49') is coated with the interference film. Thus, there is little possibility that, like the ND filter of the absorption type, bubbles and lumps are imaged on the photographed image.

In the fourth embodiment, the ND filter 49 (49') is obliquely placed with a relative relationship of arrangement mentioned above in respect of the light-receiving surface 60$a$ of the image sensor 60. Whereby, light reflected by the coated surface 49$a$ (49$a$') arrives once or less at the light-receiving surface, and the production of flare can be suppressed. Moreover, since the ND filter 49 (49') is tilted in the direction of the minor side of the effective imaging area of the image sensor 60, a small tilting angle is enough and the space for placing the ND filter 49 (49') can be minimized.

Since the electronic imaging apparatus is constructed so that the ND filter 49 and the ND filter 49' are movable in and out of the optical path and are replaceable, the ND filter 49 or 49' with different transmittance characteristics is used in accordance with the brightness of the specimen, and thereby a specimen with brightness in a wider range can be imaged.

Also, although in the fourth embodiment the IR cutoff coat is applied to the low-pass filter, a low-pass filter to which the IR cutoff coat is not applied is sometimes used. In this case, it is only necessary that, instead of the ND filter 49 (49'), the IR cutoff filter is placed in the same way. At this time, it is good practice to apply the ND coat to a surface opposite to the surface to which the IR cutoff coat is applied.

Figure 12:
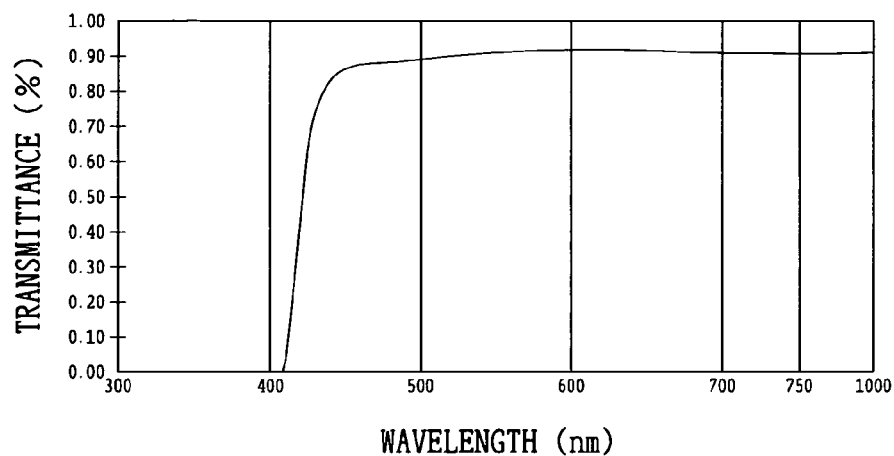
FIG. 12 is a diagram showing a spectral transmittance characteristic curve of an optical element used in the photographic camera connecting adapter of FIG. 9.

For example, as an optical element replacing the ND filter 49 (49'), as shown in FIG. 12, a filter with spectral transmittance characteristics that a half-width wave-length $\lambda c$ satisfies the condition, 390 nm≦$\lambda c$≦440 nm, may be used in accordance with its practical application.

In the fourth embodiment, the plane-parallel glass P (see FIG. 2) is thought of as being designed so that the antireflection coat is not applied. However, when the antireflection coat is applied, a considerable effect of suppressing the production of flare is obtained. As such, when the plane-parallel glass to which the antireflection coat is applied is combined with the ND filter, the production of spot flare can be further suppressed.

It is expected that the application of the antireflection coat increases the cost of the image sensor. However, the ND filter can be eliminated as the case may be. In this instance, there is the possibility that an increase in cost due to the application of the antireflection coat is neutralized by the elimination of the ND filter. In addition, by the elimination of the ND filter, a compact design and cost reduction can be afforded.

The effect of tilting the optical element to reduce spot flare caused by its surface reflection is beneficially brought about not only by the ND filter, but also by all optical elements (including the IR cutoff filter and a light-receiving surface protecting glass expected in the future) in the camera placed ahead of the light-receiving surface. Thus, Condition (1) or (2) may be applied to all optical elements in the camera placed ahead of the light-receiving surface.

Also, although in the fourth embodiment the TV camera 29 is used as the photographic camera, the photographic camera is not limited to the TV camera, and a digital camera can also be used.

Further, in the fourth embodiment, an upright microscope is applied, but the microscope is not limited to the upright microscope, and an inverted microscope is also applicable and has almost the same effect.

Fifth Embodiment

The fifth embodiment will be described with reference to FIGS. 13 and 14. This embodiment uses the IR cutoff filter as the attenuation filter.

Before undertaking the description of the fifth embodiment, the function of the present invention will be explained.

When two IR cutoff filters with almost identical spectral characteristics are used, they are arranged to have the shape of the letter V with respect to the optical axis. Whereby, a microscope digital camera with high color reproducibility can be realized in which flare light caused by the surface reflection of the filter is reduced and it is hard to produce color variation with respect to an incident light beam at any angle.

Also, the two IR cutoff filters are arranged to have the shape of the letter V in a plane in the same direction as the minor side of the image sensor (the CCD), of a plane including the optical axis.

In front of a light-receiving section (namely on the light incidence side) of the electronic image sensor, a nearly plane-parallel glass plate is provided in order to protect the light-receiving section. Flare caused when the electronic imaging apparatus is connected to the microscope is chiefly attributed to this nearly plane-parallel glass plate and the light-receiving surface.

This is because the reflectances of the surface of the nearly plane-parallel glass plate and the light-receiving surface are relatively high. Part of light incident on the light-receiving section is reflected by the surface of the nearly plane-parallel glass plate and the light-receiving surface. Reflected light is reflected again by lenses and other optical elements of the microscope optical system toward the electronic image sensor. This procedure is repeated a plurality of times and the so-called multiple reflection occurs. As a result, the spot flare is produced.

In this case, if the reflectance of the surface of the plane-parallel glass plate is high, the amount of light (the light intensity) of the spot flare will be increased. The spot flare is therefore imaged together with an image. In particular, bright spot flare is liable to occur in the proximity of the optical axis.

Generally, in the electronic imaging apparatus, the IR cutoff filter is placed ahead of the electronic image sensor in order to approach the spectral sensitivity characteristics of the human's eye. IR cutoff filters are of two types: absorption (color glass) and interference film coat. The interference film coat type has a steeper spectral characteristic curve than the absorption type and thus excels in color reproducibility, but is somewhat higher in surface reflectance.

It is thus desirable that the coated surface of the IR cutoff filter is placed to tilt with respect to the optical axis. By doing so, it is possible to reduce flare produced when light reflected by the surface of the plane-parallel glass plate and the light-receiving surface further undergoes multiple reflection between the plane-parallel glass plate the coated surface of the IR cutoff filter. In this case, it is desirable that the tilting angle of the coated surface is set so that light reflected by the coated surface arrives outside the effective imaging area of the electronic image sensor. However, when the tilting angle is too large, space required for placing the IR cutoff filter becomes wide. Consequently, the electronic imaging apparatus cannot be designed to be compact. In addition, the requirements of the mount cannot be fulfilled.

In the interference film coat type, the interference film is designed so that the optimum spectral transmittance characteristic is obtained with respect to a light ray at a particular angle of incidence (incident perpendicularly on the coated surface in most cases). As such, if the tilting angle is largely deviated from the particular angle, the optimum spectral transmittance characteristic cannot be obtained.

Thus, in order to minimize the space for placing the IR cutoff filter and maintain the characteristics of the interference film relative to the angle of incidence of the ray, it is desirable to place the IR cutoff filter so that the coated surface is tilted in the direction of the minor side of the effective imaging area. When a multiple coat is applied to a surface opposite to an interference film coated surface, the intensity of surface reflected light can be lowered.

In this case, it is desirable that the tilting angle of the coated surface satisfies Condition (1). When Condition (1) is satisfied, light (on-axis light) reflected by the IR cutoff filter arrives only once at the light-receiving section of the electronic image sensor. Furthermore, (the coated surface of) the IR cutoff filter requires a small tilting angle. Therefore, the production of flare is kept to a minimum and the space for placing the IR cutoff filter can be reduced. Since the tilting angle can be made small, the spectral transmittance characteristics of the IR cutoff filter can be made nearly equal to those of the IR cutoff filter which is not tilted.

If the tilting angle fails to satisfy Condition (1), light (on-axis light) reflected by the coated surface of the IR cutoff filter to reach the electronic image sensor will be produced at least twice. Consequently, a great deal of flare is produced, which is unfavorable.

Also, the fifth embodiment may be designed to satisfy Condition (1') of the first embodiment approximating Condition (1). It is further desirable to satisfy Condition (2) of the first embodiment.

Condition (1) is suitable for the case where there is sufficient space for placing the IR cutoff filter.

The IR cutoff filter can also be used as dustproof glass for preventing the adhesion of dust particles and damage to the light-receiving surface. As stated above, the plane-parallel glass is provided ahead of the light-receiving section of the electronic image sensor. The plane-parallel glass is located closer to the image position (the light-receiving surface) than the IR cutoff filter. Therefore, if dust particles and flaws exist on the plane-parallel glass, a problem will arise because they are imaged together with the image.

The placement of the IR cutoff filter, however, prevents the adhesion of dust particles and damage to the plane-parallel glass provided in the light-receiving section.

As the IR cutoff filter is located far away from the light-receiving surface, a dustproof effect is heightened and imaging of flaws and adhered dust particles of the IR cutoff filter is reduced. In general, an IR cutoff coated surface in which the number of film layers is much greater than that of the multiple coat is liable to produce pinholes which are film defects. As such, it is particularly favorable that an IR cutoff filter F1 closer to the CCD is located so that the IR cutoff coated surface is farther away from the CCD than the multiple coated surface because imaging of the film defects is reduced.

As mentioned above, when the IR cutoff filter closer to the electronic image sensor is obliquely placed, flare light can be reduced. However, when the filter is placed to tilt in the direction of the minor side of the electronic image sensor (the CCD), the difference of the angle of incidence of light on the filter arises between the upper and lower sides of the image and thus the spectral characteristic curve becomes asymmetrical. In the worst case, there is the fear of producing the phenomenon of color variation that coloring on the upper side of the photographed image is different from that on the lower side.

Thus, in the electronic imaging apparatus of the present invention, it is desirable that, of the two optical elements (IR cutoff filters), a connection-side optical element is placed so that an angle made by a reference axis, where the direction perpendicular to the optical axis is assumed as the reference axis, with a sensor-side surface of the connection-side optical element practically coincides with an angle multiplying a negative sign by an angle made by the reference axis with a connection-side surface of a sensor-side optical element.

Figure 14:
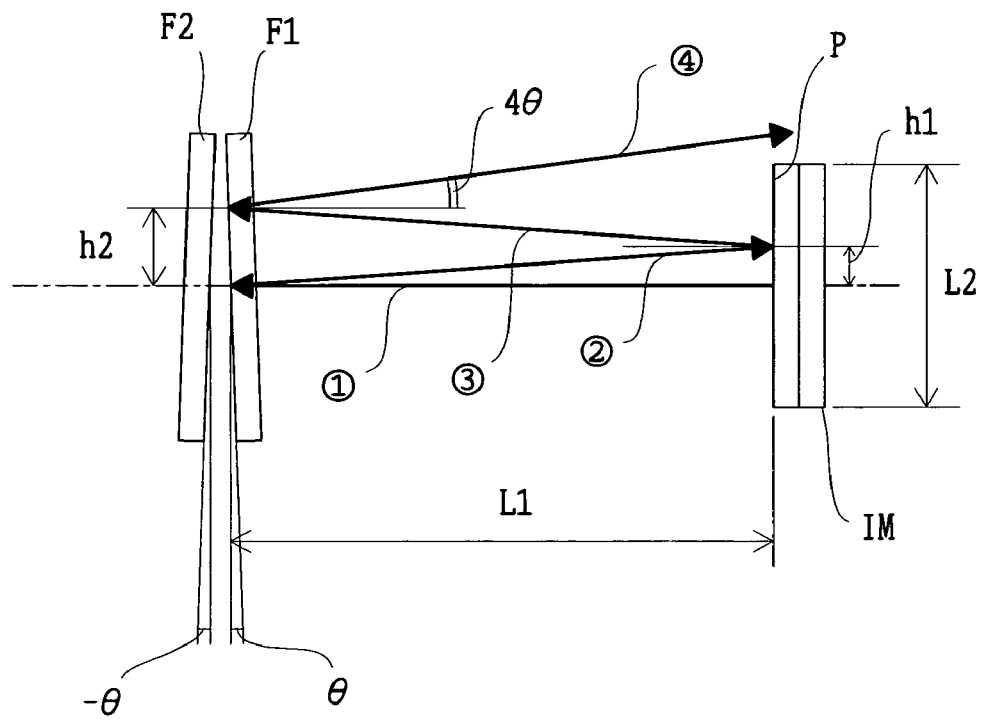
FIG. 14 is a view for explaining a reduction of color variation caused by filters in the fifth embodiment.

For example, as illustrated in FIG. 14, a connection-side IR cutoff filter F2 and a sensor-side IR cutoff filter F1 are placed to tilt symmetrically about an axis perpendicular to the optical axis (in FIG. 14, an angle made by the axis perpendicular to the optical axis with the IR cutoff filter F2 is $-\theta$ and an angle made by the axis with the IR cutoff filter F1 is $\theta$). By doing so, the production of color variation caused when the sensor-side IR cutoff filter is obliquely placed to eliminate flare is neutralized by the connection-side IR cutoff filter and can be reduced.

Figure 13:
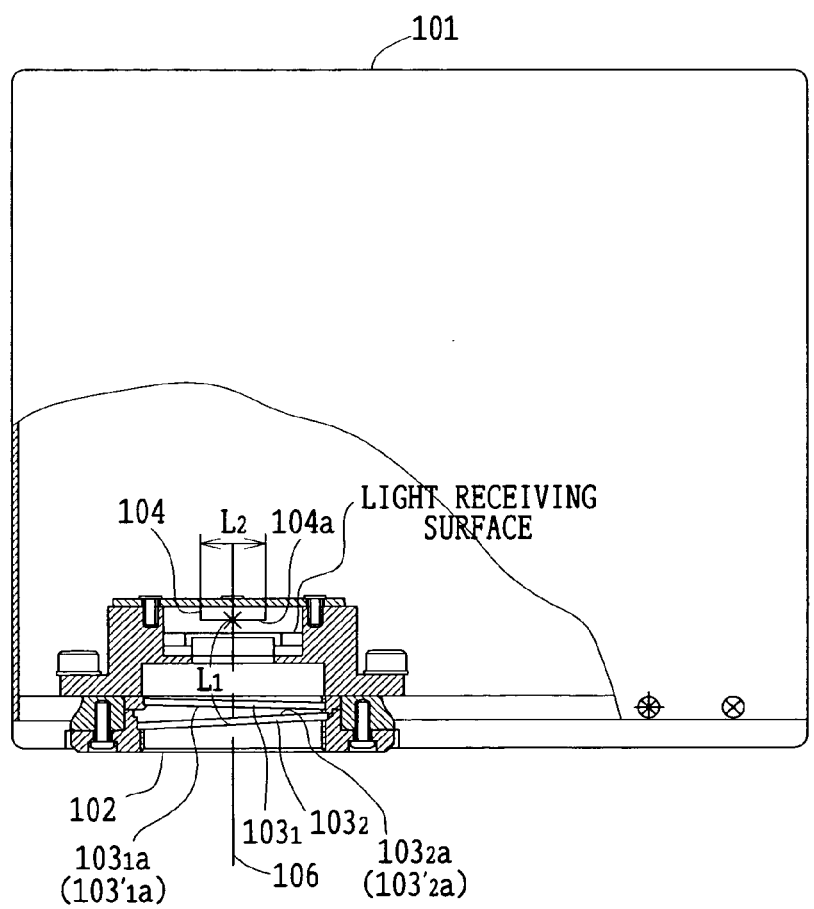
FIG. 13 is a sectional view showing essential parts in a fifth embodiment of the electronic imaging apparatus for microscopes according to the present invention.

As shown in FIG. 13, the electronic imaging apparatus of the fifth embodiment includes a body section 101, a mount section 102 connected to the body section 101, and IR cutoff filters $103_1$ and $103_2$ provided in the mount section 102. The body section 101 has a CCD 104 as the electronic image sensor. In the mount section 102, one surface comes in contact with the surface of the body section 101 and is fixed by screws. On the opposite surface, a C mount is provided as a connection connected to the optical apparatus such as the microscope.

The IR cutoff filters $103_1$ and $103_2$ are optical elements, having the function of reducing the transmittance of light in a preset wavelength region, of light incident from the optical apparatus, to a preset value or lower. Also, in FIG. 13, reference numeral 106 represents the optical axis.

In the fifth embodiment, each of the IR cutoff filters $103_1$ and $103_2$ is such that the IR cutoff coat of the interference film type is applied to the plane-parallel glass. Assuming the direction perpendicular to the optical axis 106 as the reference axis, the IR cutoff filters $103_1$ and $103_2$ are arranged at tilting angles of θ=2° and −2°, respectively, with the reference axis. The coated surfaces of the IR cutoff filters $103_1$ and $103_2$ are, of course, arranged at tilting angles of θ=2° and −2°, respectively, with the reference axis. The tilting direction is a direction followed along the minor side of a light-receiving surface 104a. The distance L1 extending along the optical axis 106 from a surface $103_1a$ of the IR cutoff filter $103_1$ to the light-receiving surface 104a of the CCD 104 is 13 mm. The length L2 of the minor side of the effective imaging area in the CCD 104 is 6.6 mm.

Figure 15:
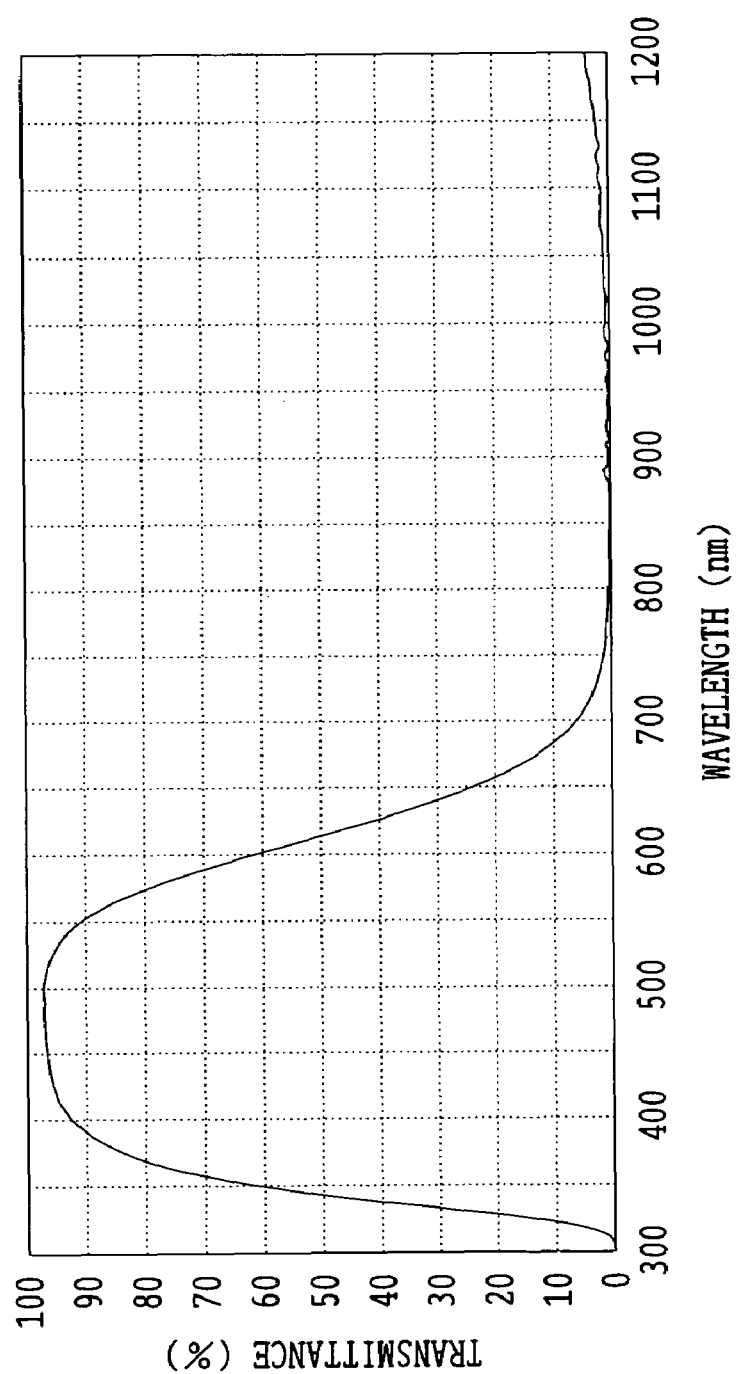
FIG. 15 is a diagram showing a spectral transmittance characteristic curve of IR cutoff filters used in the fifth embodiment.

The transmittance of the IR cutoff filters $103_1$ and $103_2$ is over 90% in the wavelength range from 410 to 625 nm and is below 5% in the wavelength range from 700 to 900 nm. The spectral transmittance characteristic curve of the IR cutoff filters $103_1$ and $103_2$ of the interference film type is shown in FIG. 15.

Also, the fifth embodiment satisfies Condition (1), but fails to satisfy Condition (2). In order to satisfy Condition (2), each of the IR cutoff filters $103_1$ and $103_2$ must be tilted by at least 7.2°.

In the fifth embodiment, the IR cutoff filter $103_1$ is placed so that the IR cutoff coated surface $103_1a$ is situated on the opposite side (the optical apparatus side) of the light-receiving surface 104a. Whereby, a high-reflectance coated surface can be isolated from the light-receiving surface 104a.

The IR cutoff filters $103_1$ and $103_2$ are designed to be movable in and out of the optical path. In the fifth embodiment, the mount section 102 is mounted to the body section 101 by screws. Thus, by removing the screws, the IR cutoff filters $103_1$ and $103_2$ can be replaced with IR cutoff filters $103'_1$ and $103'_2$ (not shown) of spectral transmittance characteristics different from those of the IR cutoff filters $103_1$ and $103_2$.

Figure 16:
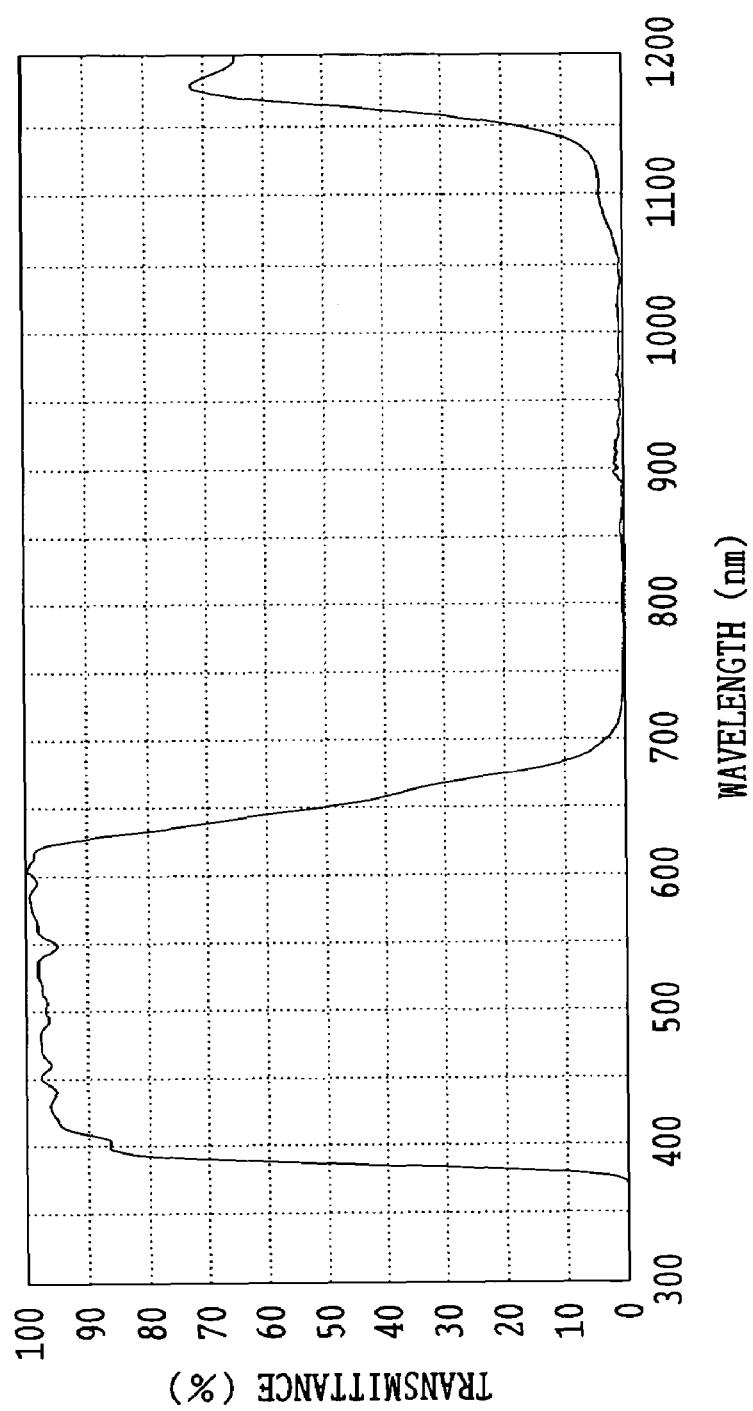
FIG. 16 is a diagram showing a spectral transmittance characteristic curve of other IR cutoff filters used in the fifth embodiment.

For example, instead of the IR cutoff filters $103_1$ and $103_2$, the IR cutoff filters $103'_1$ and $103'_2$ of the color glass type in which the transmittance is over 90% in the wavelength range from 400 to 550 nm and is below 6% in the wavelength range from 700 to 900 nm may be used. The spectral transmittance characteristic curve of the IR cutoff filters $103'_1$ and $103'_2$ of the color glass type is shown in FIG. 16.

Also, even when the IR cutoff filters $103_1$ and $103_2$ are replaced with the IR cutoff filters $103'_1$ and $103'_2$ of the color glass type, the distance L1 extending along the optical axis 106 from a surface $103'_1a$ of the IR cutoff filter $103'_1$ to the light-receiving surface 104a of the CCD 104, the tilting angles (θ and −θ), and the tilting directions are almost the same as in the IR cutoff filters $103_1$ and $103_2$ of the interference film type.

In the IR cutoff filters of the color glass type, when the multiple coats are applied to both surfaces of each filter, the surface reflection can be suppressed. In doing so, the filters need not necessarily be tilted, but when they are obliquely arranged, the production of flare light can be prevented.

The electronic imaging apparatus of the fifth embodiment constructed as mentioned above, when photographing the specimen, is connected to the microscope, not shown, through the mount section 102.

According to the fifth embodiment, the IR cutoff filters $103_1$ and $103_2$ are coated with the interference films. Thus, there is little possibility that, like the filter of the absorption type, bubbles and lumps are imaged on the photographed image.

In the electronic imaging apparatus of the fifth embodiment, the IR cutoff filters $103_1$ and $103_2$ are obliquely placed with a relative relationship of arrangement mentioned above in respect of the light-receiving surface 104a of the CCD 104. Whereby, light reflected by the IR cutoff coated surfaces arrives once or less at the light-receiving surface, and the production of flare can be suppressed. Moreover, since the IR cutoff filters $103_1$ and $103_2$ are tilted in the direction of the minor side of the effective imaging area of the CCD 104, a small tilting angle is enough and the space for placing the IR cutoff filters can be minimized.

Since the fifth embodiment is constructed so that the IR cutoff filters $103_1$ and $103_2$ can be replaced with the IR cutoff filters $103'_1$ and $103'_2$, the IR cutoff filters $103_1$ and $103_2$ or the IR cutoff filters $103'_1$ and $103'_2$ with different spectral transmittance characteristics are used in accordance with the kind of specimen and micros-copy, and thereby the specimen can be imaged in a wider range.

In the fifth embodiment, the plane-parallel glass is thought of as being designed so that the antireflection coat is not applied. However, when the antireflection coat is applied, a considerable effect of suppressing the production of flare is obtained. As such, when the plane-parallel glass to which the antireflection coat is applied is combined with the IR cutoff filters, the production of flare can be further suppressed.

The effect of tilting the optical element to reduce flare caused by its surface reflection is beneficially brought about not only by the IR cutoff filter, but also by all optical elements in the camera placed ahead of the light-receiving surface. Thus, Condition (1) or (2) may be applied to all optical elements in the camera placed ahead of the light-receiving surface.

The present invention is not limited to the above embodiments, and various modifications can be made without departing from the scope of the present invention. In the above embodiments, various aspects of the present invention are included and are extracted by proper combinations in a plurality of components to be disclosed.

What is claimed is:

1. An electronic imaging apparatus comprising:
   a connecting section connected to an optical apparatus;
   a first optical element having a preset transmittance with respect to light in a preset wavelength region, incident from the optical apparatus; and
   an electronic image sensor receiving the light transmitted through the first optical element,
   wherein the first optical element has a transmittance of 50±10% or less, and
   wherein the first optical element is placed so that a coated surface of the first optical element satisfies the following condition:

$$2 \times L1 \times \tan 2\theta + L1 \times \tan 4\theta \geq L2/2$$

where L1 is a distance extending along an optical axis from the coated surface of the first optical element to a light-receiving surface of the electronic image sensor, L2 is a length of a minor side of an effective imaging area in a light-receiving section of the electronic image sensor, and θ is an angle made by a reference axis with the coated surface of the first optical element, where a direction perpendicular to the optical axis is assumed as the reference axis.

2. An electronic imaging apparatus comprising:
   a connecting section connected to an optical apparatus;
   a first optical element having a present transmittance with respect to light in a preset wavelength region, incident from the optical apparatus;
   a second optical element placed adjacent to the first optical element; and
   an electronic image sensor receiving the light transmitted through the first optical element,
   wherein the first optical element and the second optical element have a transmittance of 50% or less with respect to light in a wavelength range from 700 to 900 nm, of light incident from the optical apparatus, and
   wherein the first optical element and the second optical element are provided to be movable in and out of an optical path.

3. A photographic camera connecting adapter, interposed between an optical apparatus and a photographic camera, comprising:
   a first connecting section connected to the optical apparatus;
   a second connecting section connected to the photographical camera; and
   an optical element having a preset transmittance with respect to light in a preset wavelength region, incident from the optical apparatus,
   wherein the optical element has a transmittance of 50±10% or less, and
   wherein the optical element is placed so that a coated surface of the optical element satisfies the following condition:

$$2 \times L1 \times \tan 2\theta + L1 \times \tan 4\theta \geq L2/2$$

where L1 is a distance extending along an optical axis from the coated surface of the optical element to a light-receiving surface of an electronic image sensor, L2 is a length of a minor side of an effective imaging area in a light-receiving section of the electronic image sensor, and θ is an angle made by a reference axis with the coated surface of the optical element, where a direction perpendicular to the optical axis is assumed as the reference axis.

4. A photographic camera connecting adapter, interposed between an optical apparatus and a photographic camera, comprising:
   a first connecting section connected to the optical apparatus;
   a second connecting section connected to the photographical camera;
   an optical element having a preset transmittance with respect to light in a preset wavelength region, incident from the optical apparatus; and
   a second optical element,
   wherein the optical element and the second optical element have a transmittance of 50% or less with respect to light in a wavelength range from 700 to 900 nm, of light incident from the optical apparatus, and
   wherein the optical element and the second optical element are provided to be movable in and out of an optical path.

* * * * *